April 15, 1969     H. NIX     3,438,097
BRAKING ARRANGEMENT
Filed Jan. 10, 1966
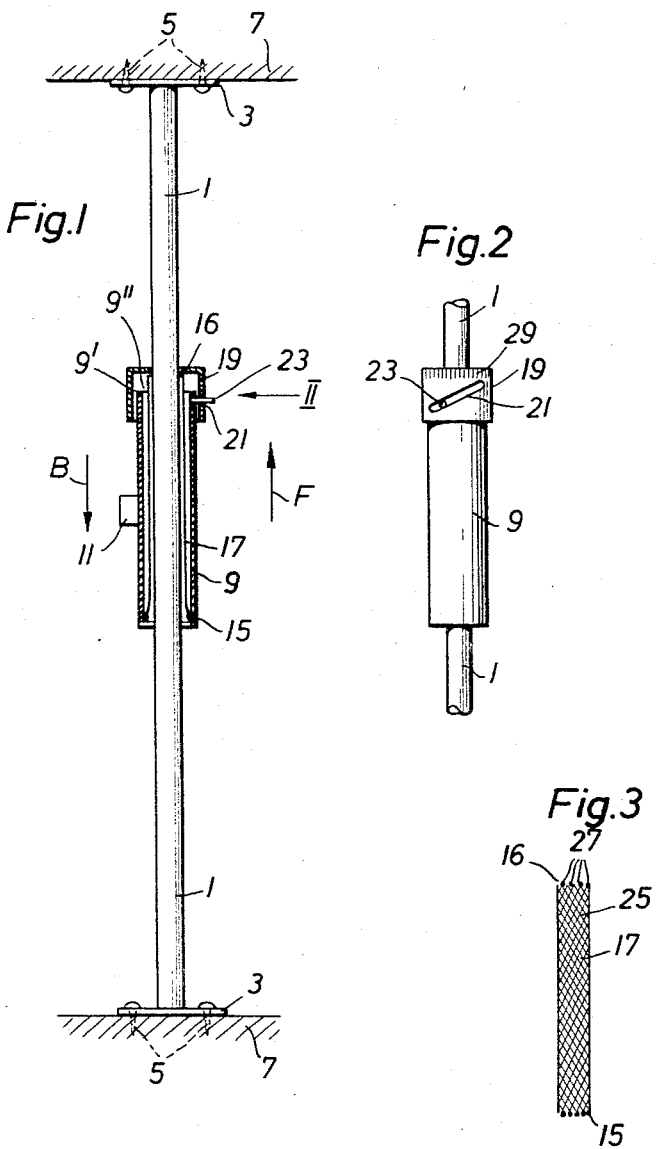
INVENTOR
Hans Nix
BY
Michael J. Striker

United States Patent Office 3,438,097
Patented Apr. 15, 1969

3,438,097
BRAKING ARRANGEMENT
Hans Nix, Ebernburgweg 27, Cologne-Nippes, Germany
Filed Jan. 10, 1966, Ser. No. 519,546
Claims priority, application Germany, Jan. 15, 1965,
A 48,123
Int. Cl. F16b 2/22, 12/42, 7/04
U.S. Cl. 24—123     4 Claims

ABSTRACT OF THE DISCLOSURE

A motion braking device includes an expansible and contractile sleeve composed of a plurality of strands arranged about a common axis. The sleeve is received within a tubular member and has one of its ends secured to the internal surface of the tubular member. A rod-shaped member extends through the sleeve and the other end of the latter engages the external surface of the rod-shaped member. Movement of one of the members axially with reference to the other effects axial compression and radial expansion of the sleeve if the movement occurs in one direction and axial extension and radial constriction of the sleeve if the movement occurs in the other direction direction in which latter case the sleeve will grip the tubular member and frictionally brake continued movement.

---

The present invention relates to a braking arrangement. More specifically, the invention relates to an adjustable braking arrangement. Still more specifically, the invention relates to an adjustable braking arrangement for braking the motion of a reciprocable element in one direction of reciprocation, while not interfering with the motion in the opposite direction of reciprocation.

In many instances, in which a member moves in two opposite directions it is desirable to brake such member as it moves in one of these directions, while not interfering with its movement in the other direction. Thus, for instance, in pieces of furniture provided with tilt-tops it is desirable not to interfere with the opening movement of the top, while providing a braking action designed to be effective only during closing movement of the tilt-top, so as to prevent "slamming" of the top. The same is true in tilt-type windows, and in other similar apparatus. It is particularly desirable in such cases that the braking action take place not suddenly, but gradually, so that the movable element in question may move into its terminal position or to a desired intermediate position slowly, e.g. under the influence of gravity. In other words, the braking action should be adjustable, and this feature is even more important if the movement to be braked takes place under the influence of a biasing force, as is the case, for instance, with the closing movement of a spring-biased storm or screen door.

Having realized the existing need for an arrangement with the above features, it is a general object of my present invention to provide a device of the type described above.

A more specific object of the invention is to provide a braking device for braking a motion in one direction, while not interfering with a motion in the opposite direction.

Still another object of the invention is to provide a device of the type described in which the braking action is adjustable.

A concomitant object of the invention is to provide such a device in which the adjustment of the braking action is infinitely variable.

In accordance with one feature of the invention I provide a braking device which comprises an elongated female member and an elongated male member extending through the female member, said members respectively having an internal and external surface. Furthermore, I will provide a unidirectional braking element consisting of an elastically deformable material defining an annulus about the male member intermediate these surfaces, and having a first portion secured to one of the members and an axially spaced portion in engagement with the surface of the other of the members. This braking element will have a transverse extension and a longitudinal extension and the material of the braking element will have a tendency to expand in one of these extensions in response to a decrease in the other of the extensions. Thereby I achieve that, when the members move with reference to one another in one direction and in a sense tending to decrease one of the extensions, the other of the extensions will increase and the braking element will frictionally engage the surface of the other of the members whereas, when such movement occurs in the opposite direction and in a sense tending to increase said one extension, the other extension will decrease and the frictional engagement will decrease correspondingly.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing in which:

FIG. 1 is a partly sectioned view of a braking arrangement embodying the present invention;

FIG. 2 is a side-elevational view of the embodiment shown in FIG. 1, as seen in the direction of the arrow II in FIG. 1; and FIG. 3 is an elevational view of the braking element used in the novel braking arrangement of FIGS. 1 and 2.

Discussing now the drawing in detail, and firstly FIG. 1 thereof, it will be seen that there is provided an elongated male member 1. In the present exemplary embodiment it will be assumed that this is a cylindrical rod having a smooth, for instance, polished surface. This rod is provided at its opposite ends with fastening means, such as abutment plates 3, which are secured by means of screws, nails or similar securing means 5 to suitable stationary supports 7.

A female member, in the form of a cylindrical sleeve 9, surrounds the rod 1 and is provided with an end face 9' having therein an axial opening 9'' just slightly exceeding the cross sectional area of the rod 1. The member or element whose movement is to be braked is suitably secured to the movable sleeve 9, for example by means of a schematically indicated securing arrangement 11.

Interposed between the outer surface of rod 1 and the inner surface of sleeve 9 is a unidirectional braking element 17, which will be described in more detail below. One end 15 of the braking element 17 is secured to the inner surface of the sleeve 9 at one end of the sleeve, whereas the opposite end 16 of element 17 extends through the opening 9'' of sleeve 9 and somewhat beyond the end face 9' thereof.

Discussing now the unidirectional braking element 17 as illustrated in FIG. 3, it will be seen that this comprises a tubular element constructed from a woven material utilizing threads or similar filamentary material 25 which extend parallel to one another and substantially helically of the longitudinal axis of the element 17. Advantageously the filamentary material 25 is an elastically deformable material of relatively stiff, e.g. semi-rigid characteristics, preferably a plastic material. It must be remembered that this filamentary material, which is adapted to engage the surface of the rod 1, must develop a certain friction upon engagement thereof. In its normally relaxed condition—that is in a state in which it is not axially compressed—the diameter of the element 17 will be just slightly less than the diameter of the rod 1, the semi-rigidity of the filaments 25 serving to normally maintain the element 17 in this relaxed condition. If, now, this diagonally woven tubular element 17 is axially compressed towards the middle from both ends 15 and 16 thereof, so that its longitudinal extension is decreased, then the filaments 25 will have a tendency to escape radially and as a result the cross sectional diameter of the element 17 will be increased. Upon release of such pressure the element will again return to its relaxed condition under the urging of the filaments 25. Of course it will be obvious that care must be taken not to let the filaments 25 unravel, and these filaments must therefore be suitably connected together at the respective ends 15, 16 of the member 17, for example by welding them together if the filaments 25 are of plastic material, or by some other expedient such as tying which will be obvious to those skilled in the art.

Returning now to FIG. 1, it will be seen that the end of sleeve 9 which is provided with the end face 9' is surrounded by a cap 19 which is of slightly larger diameter than the sleeve 9, so that the end portion of sleeve 9 is received in this cap. In its circumferential wall the cap 19 is provided with a slot 23 (see FIG. 2) which is inclined intermediate the opposite ends of cap 19. Adjacent to the upper end, that is adjacent to the end face 9' of sleeve 9, there is secured to the latter a radially extending pin or other suitable lever 23, which extends outwardly through the slot 21 of the cap 19. Advantageously, the latter will be provided with a roughened portion, such as a knurled section 29, to provide for a firmer grip by a person operating the novel braking arrangement. It will now be obvious that if the cap 19 is rotated with respect to the sleeve 9, the pin 23 will slide in the slot 21, guided thereby, so that the cap 19 will move axially with respect to the sleeve 9. Since the inner surface of the end wall of cap 19 overlies the free end 16 of the braking element 17, such axial movement of the cap 19 in a direction towards the end 15 of element 17 will cause radial expansion of the element 17, so that the latter will tend to loosen its engagement with the surface of rod 1. Of course, movement in the opposite direction, that is axial movement of cap 19 in the direction away from the end 15 of element 17, will increase the longitudinal extension of element 17 and will simultaneously decrease the radial extension thereof, whereby element 17 will engage the surface of rod 1 more firmly.

The operation of the novel braking element will now be obvious. Let it be assumed that the direction of movement which is to elicit the braking action is that which is designated with the arrow B in FIG. 1. If, now, the element which is to be braked and which is secured to the sleeve 9 by means of the securing means 11, exerts a force on the sleeve 9 which acts in the direction of the arrow B, and if the inner surface of the end face of cap 19 is spaced from the free end 16 of element 17, then the element 17 will be longitudinally extended as a result of the frictional engagement of its end 16 with the surface of rod 1, and will thereby frictionally engage the surface of rod 1 over the length of element 17. This, in turn, will naturally block motion in the direction of the arrow B.

If complete blocking of the motion is not desired, the cap 19 will be rotated in a sense to place the inner end face of cap 19 into slight engagement with the end 16 of the element 17. This causes axial compression of element 17, resulting in an increase of the diameter thereof, and frictional engagement of element 17 with the surface of rod 1 will thereby be reduced. This, in turn, permits the force acting in the direction of arrow B to move the sleeve 9 gradually in the direction of this arrow. It will be understood, of course, that as the cap 19 is further rotated in a direction tending to axially compress the element 17, frictional engagement thereof with the surface of rod 1 will progressively decrease, and that thereby movement of the sleeve 9 will become quicker. If the cap 19 is moved in the direction toward the end 15 of element 17 until its inner end face engages the end face 9' of sleeve 9, then the braking action will be negated, and a force acting in the direction of arrow B will be able to move the sleeve 9 freely without interference.

From what has been said before it will now be obvious that a movement of the sleeve 9 in reverse direction, that is in direction of the arrow F in FIG. 1, will cause axial compression of the braking element 17, since the latter is secured in frictional engagement with the surface of rod 1 at its end 16, but is secured with its end 15 to the sleeve 9. Such axial compression will in turn cause radial expansion and the braking action in direction of the arrow F will be substantially negated so that such movement can proceed freely.

Of course it will be understood that many modifications are possible and that the embodiment shown in the drawing is by way of example only. For instance, the arrangement of the elements can be reversed, such that for example the sleeve 9 can be secured to a stationary support means 7 and the rod 1 can be made movable. Also, the rod 1 can be of various cross sectional configurations, as is indeed also true of the element 17. Furthermore, the rod 1 need not be straight, inasmuch as both the rod 1 and the sleeve 9 may be arcuate. Furthermore, the cap 19 can be secured to the sleeve 9 in a different manner from that shown in the drawings, for example by means of cooperating screw threads on the two members. The rod 1 and the sleeve 9 may consist of metal or various other suitable materials, such as plastics. Also, it is not necessary that the surface of rod 1 be entirely smooth, or even polished; it is quite possible to make the surface of rod 1 slightly rough to increase frictional engagement.

Clearly, a very important feature of the present invention is the fact that it can be very small in its overall dimensions, and that it will yet provide reliable braking action which is not only adjustable, but which is actually infinitely variable. Also, the adjustment of the braking action is simple and can be accomplished at any time. The novel device in accordance with the invention is simple to construct and inexpensive to manufacture; furthermore, it requires no maintenance and is not subject to wear to any very significant degree.

It will be understood that each of the elements described above or two or more together, may also find a useful application in other types of braking devices differing from the types described above.

While the invention has been illustrated and described as embodied in a braking device, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. A structure of the type described, comprising an elongated female member; an elongated male member extending through said female member, said members respectively having an internal and an external surface and a first one of said members being mounted so as to be movable relative to the second one of said members under the influence of gravity; a unidirectional braking element of an elastically deformable material forming a sleeve about said male member intermediate said surfaces and having an annular first end portion secured to one of said members and an axially spaced freely radially expandable and contractable second end portion in frictional engagement with the surface of the other of said members, said braking element having a transverse extension and a longitudinal extension and said material of said braking element having a tendency to expand in one of said extensions in response to a decrease in the other of said extensions whereby, when said members move with reference to one another in one direction and in a sense tending to decrease one of said extensions, the other of said extensions will increase and said braking element will frictionally engage the surface of said other member whereas, when such movement occurs in an opposite direction and in a sense tending to increase said one extension, said other extension will decrease and said frictional engagement will decrease; and adjusting means movably mounted on one of said members and adapted to engage said second end portion of said braking element and operative for carrying the extent of one of said extensions to thereby vary the other so as to enable adjusting of the frictional engagement of the surface of said other member in response to movement of said first member under the influence of gravity in such a manner as to enable a user to select a predetermined frictional engagement and thus a predetermined speed of movement for said first member.

2. A structure as defined in claim 1, wherein said braking element comprises a sleeve consisting of a plurality of filaments made from a synthetic plastic material and woven together so as to form a net-like fabric in which said filaments extend substantially helically of said sleeve.

3. A structure as defined in claim 1, wherein said adjusting means comprises a cap member having an end wall having an opening therethrough through which said male member extends, and surrounding and secured to an end of said sleeve adjacent said second portion of said braking element and with freedom of axial movement relative to said sleeve, and wherein said other end of said braking element extends axially beyond said sleeve towards said end wall whereby, when said cap member is moved in axial direction of said sleeve close to the same, said end wall of said cap member will engage said other end of said braking element and axially compress the same.

4. A structure as defined in claim 3, wherein said cap member is provided in a circumferential wall thereof with a slot extending partly around said wall and inclined in direction from one toward the other end of said cap member; and wherein said arrangement comprises a pin secured to said sleeve at said end thereof and projecting radially therefrom, said pin having a portion received in said slot whereby, upon rotation of said cap member, said portion of said pin will slide in said slot and said cap member will move axially with reference to said sleeve.

References Cited
UNITED STATES PATENTS

| | | |
|---|---|---|
| 2,318,164 | 5/1943 | Kellems. |
| 2,434,358 | 1/1948 | Frank. |
| 2,666,970 | 1/1954 | Grant. |
| 3,343,231 | 9/1967 | Clay. |

BERNARD A. GELAK, *Primary Examiner.*